US009163699B2

(12) United States Patent
Jaeker

(10) Patent No.: US 9,163,699 B2
(45) Date of Patent: Oct. 20, 2015

(54) ENERGY GUIDING CHAIN WITH ROLLERS
(71) Applicant: igus GmbH, Cologne (DE)
(72) Inventor: Thilo-Alexander Jaeker, Sankt Augustin (DE)
(73) Assignee: Igus GmbH, Cologne (DE)
(*) Notice: Subject to any disclaimer, the term of this patent is extended or adjusted under 35 U.S.C. 154(b) by 0 days.
(21) Appl. No.: 14/395,117
(22) PCT Filed: Apr. 11, 2013
(86) PCT No.: PCT/EP2013/057594
§ 371 (c)(1),
(2) Date: Oct. 17, 2014
(87) PCT Pub. No.: WO2013/156388
PCT Pub. Date: Oct. 24, 2013
(65) Prior Publication Data
US 2015/0089917 A1 Apr. 2, 2015
(30) Foreign Application Priority Data Apr. 19, 2012 (DE) ...................... 20 2012 003 908 U

(51) Int. Cl.
*F16G 13/16* (2006.01)
*H02G 11/00* (2006.01)
(52) U.S. Cl.
CPC .............. *F16G 13/16* (2013.01); *H02G 11/006* (2013.01)
(58) Field of Classification Search
CPC ....................................................... F16G 13/16
USPC .......................................................... 59/78.1
See application file for complete search history.

(56) References Cited

U.S. PATENT DOCUMENTS 3,948,041 A * 4/1976 Borjesson ........................ 59/78.1
6,425,238 B1 * 7/2002 Blase .............................. 59/78.1

(Continued)

FOREIGN PATENT DOCUMENTS

| EP | 1584841 A1 | 10/2005 |
|---|---|---|
| GB | 1 444 307 A | 7/1976 |
| JP | 2001221293 A | 8/2001 |

OTHER PUBLICATIONS

English language International Search Report mailed Jul. 9, 2013, received in corresponding PCT Application No. PCT/EP13/57594, 3 pgs.

(Continued)

*Primary Examiner* — David B Jones
(74) *Attorney, Agent, or Firm* — Grossman Tucker Perreault Pfleger, PLLC

(57) ABSTRACT

On an energy guiding chain, for guiding hoses, cables and the like, with a number of chain links (1) connected to each other in articulated fashion, said links being formed by side straps (11, 12), which are parallel to each other and connected to form parallel side strap strands, and cross-members (31) connecting them, where the side straps can be pivoted relative to each other about a pivoting axis common to two adjacent side straps, where the energy guiding chain can be traversed in such a way that it forms a loop having an upper strand, a lower strand and a deflection zone connecting them, as a result of which an inner side and an outer side in relation to the loop is defined on the chain links, and where at least one end of the cross-members (31*a*) on the outer side of the chain links (1) can be detached from the side strap and pivoted in order to open the chain link (1), while the cross-members (31*i*) on the inner side of the chain links are permanently connected to the side straps, it is envisaged that rollers (21) be recessed into at least some side straps, said rollers projecting from the narrow face of the side straps and being able to roll on the narrow faces (17) of the side straps of the opposite strand during traversing of the chain, and that the permanent connection of the cross-members (31*i*) is made on the surfaces of the side straps facing towards the inside of the chain link.

7 Claims, 2 Drawing Sheets

(56) References Cited

U.S. PATENT DOCUMENTS

Figure 1:
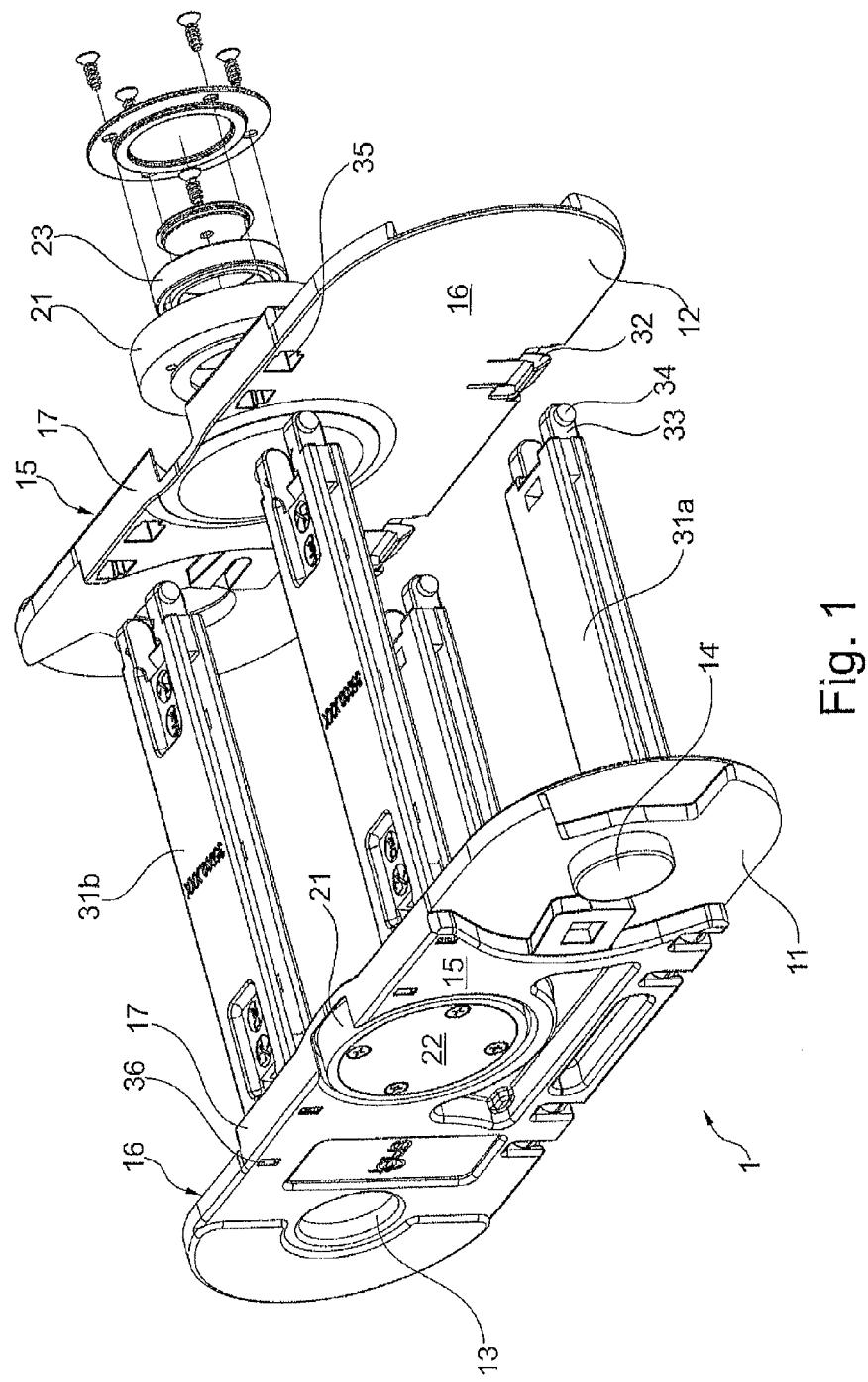

| | | |
|---|---|---|
| 6,550,233 B2 | 4/2003 | Blase |
| 6,612,104 B2 * | 9/2003 | Blase ............................. 59/78.1 |
| 6,997,412 B2 * | 2/2006 | Komiya ......................... 59/78.1 |
| 7,310,936 B2 | 12/2007 | Saiki et al. |
| 7,444,800 B2 | 11/2008 | Hermey |
| 7,497,072 B2 * | 3/2009 | Hermey ......................... 59/78.1 |
| 7,500,346 B2 * | 3/2009 | Blase ............................. 59/78.1 |
| 8,459,000 B2 * | 6/2013 | Harada .......................... 59/78.1 |
| 8,806,847 B2 | 8/2014 | Blase et al. |
| 2005/0040275 A1 | 2/2005 | Komiya |

OTHER PUBLICATIONS

English language Translation of the International Preliminary Report on Patentability/Written Opinion mailed Oct. 30, 2014, received in corresponding PCT Application No. PCT/EP13/57594, 8 pgs.

\* cited by examiner

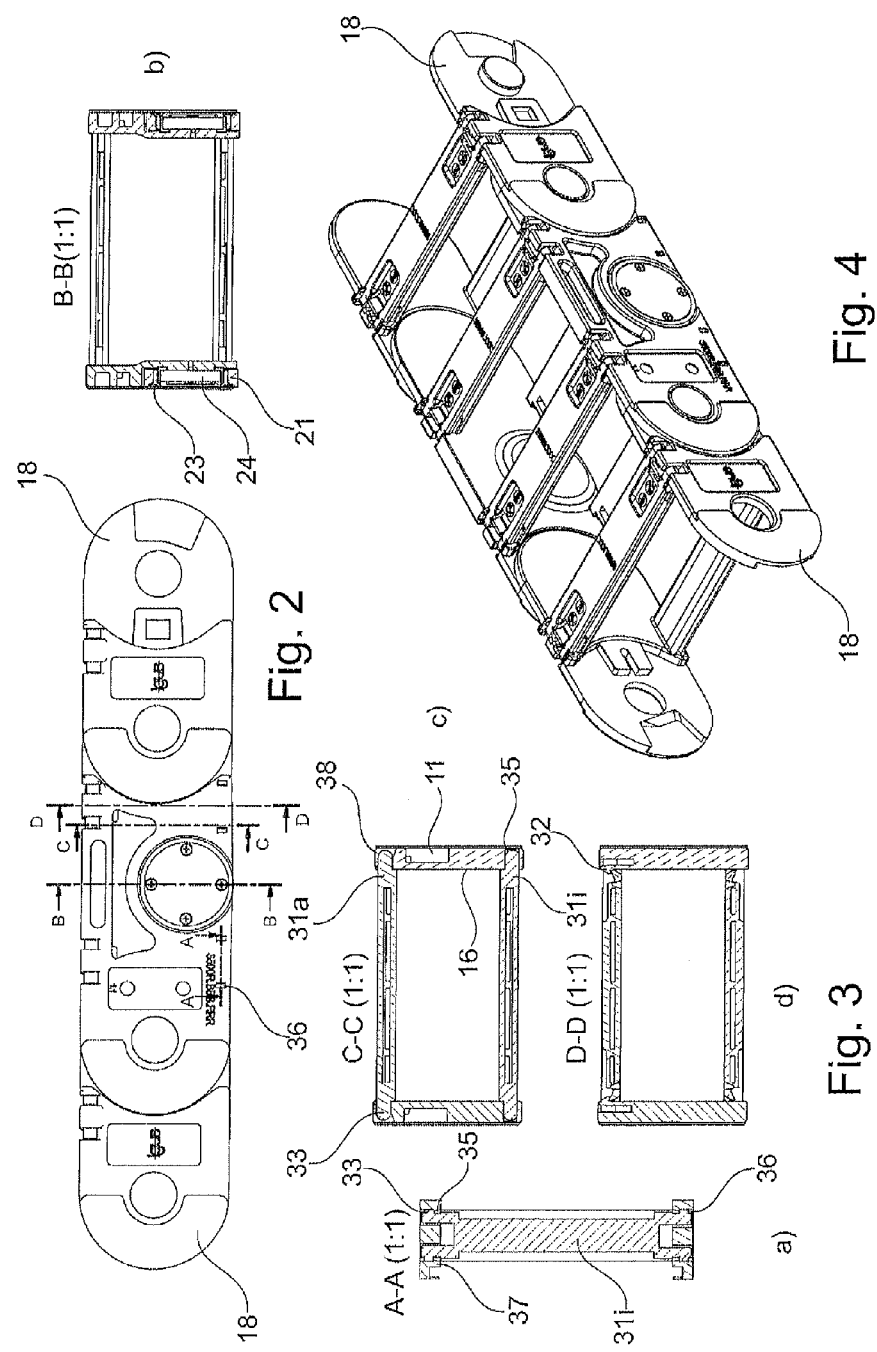

ENERGY GUIDING CHAIN WITH ROLLERS

The invention relates to an energy guiding chain according to the generic part of the main claim.

Energy guiding chains of this kind are used to supply a consumer that moves relative to a stationary connecting point with energy carriers, such as electricity, water, gas and the like, and/or to transmit signals. They are assembled from a number of chain links that pivot relative to each other, are made up of two opposite side straps and cross-members connecting them, and are capable of accommodating cables, hoses and the like in the space bordered by them. The space can be further subdivided by dividing webs between the cross-members. To adapt to the changing distance from the connecting point when the consumer moves, the energy guiding chain forms a loop displaying an upper strand, a lower strand and a deflection zone having a radius of curvature defined by limitation of the pivoting angle between adjacent straps. In this context, the upper strand can at least partially rest on the lower strand, sliding on it when the consumer moves. The necessary radii of curvature in the deflection zone can vary, depending on the spatial conditions, the length of the chain, the weight and properties of the supply lines accommodated by the chain, etc. Guide rails can be provided to prevent lateral deflection of the chain.

A general object when designing energy guiding chains of this kind is to ensure that the movement of the upper strand on the lower strand is as reliable, energy-saving and quiet as possible. To this end, the surfaces of the chain links facing towards the inside of the loop are designed to be as smooth as possible, and can additionally be provided with rollers.

A general description of an energy guiding chain of this kind is contained in WO 99/57457 A1.

Under the designation E2/000 E-Kette®, the applicant markets an energy guiding chain in which the chain links are assembled from a one-piece bottom part, comprising the two side straps and the inner cross-members facing towards the inside of the loop, and outer cross-members that are connected in detachable or pivoting fashion to the narrow faces of the side straps facing towards the outer side of the loop. In this context, the side straps are of cranked design, such that one end forms the outer side of the chain link, the other end forming the inner side of the chain link. So, when this chain is traversed, the inner cross-members designed in one piece with the side straps slide on each other. Because of the associated friction, however, the length of the sliding area is limited and this chain is not suitable for long travel paths.

Rollers recessed into the side straps, as familiar from other energy guiding chains, appear suitable in order to be able to perform traversing of the chain even more easily, with even less noise, in an even more energy-saving manner and over longer distances. However, this would make production of the bottom parts more complicated, and it does not appear economical to manufacture and stock the necessary variety of heights and widths of one-piece bottom parts.

The object of the invention is thus to develop the known energy guiding chain in such a way that it can be traversed more easily and over longer distances and can, at the same time, be produced economically in diverse dimensions.

This object is solved by an energy guiding chain according to the main claim.

So, the chain links of the energy guiding chain according to the invention now comprise two side straps, into which rollers are recessed, a number of inner cross-members that are permanently connected to the inner side of the side straps, and a number of outer cross-members, at least one end of which can be detached from the side straps, and pivoted if appropriate, in order to open the chain links. Two inner and two outer cross-members are preferably provided.

Since the narrow faces of the side straps are not interrupted by the fastening of the inner cross-members, they can form a continuous running surface when the chain is stretched out, this permitting easy running of the rollers of the opposite strand. For the rollers to function, it usually suffices if they protrude roughly 0.5 to 2 mm from the running surface.

Fastening of the inner cross-members can be achieved by means of an elastic, positive snap-in connection that can be released using a special tool, if necessary. To this end, the cross-members can, for example, be provided with projections displaying snap-in noses that, upon insertion, engage undercut recesses provided for this purpose in the inner surfaces of the side straps. If necessary, this connection can be released by inserting a tool through an opening of the recess leading to the outer side of the side straps.

In contrast to the inner cross-members, the outer cross-members do not need to be permanently connected to the side straps, but can be movable and detachable, such that they can be detached at one end and pivoted about the other end in order to be able to open the chain link. A suitable fastening is described in DE 199 19 076 A2. In this context, the ends of the cross-member are provided with extensions displaying journals that are inserted into openings in the narrow face of the side straps, where they are retained elastically by a snap-in nose. The journal, and thus the cross-member, can be released by elastically forcing out the snap-in nose.

It is particularly advantageous that cross-members of this kind can also be used for permanent connection to the side strap. If their extensions are inserted into the previously described undercut recesses on the inner side of the side straps, the journal engages the undercut and can no longer be released. So, the same component can be used both as an inner cross-member and as an outer cross-member.

The energy guiding chain according to the invention now needs only one type of side strap for different widths. The cross-members can easily be produced in different lengths in order to be able to realise different chain link widths.

In a preferred embodiment, the side straps are designed in such a way that one of their ends displays a pivoting sleeve to accommodate the pivoting journal of the adjacent side strap, the other end displaying a pivoting journal for inserting into the pivoting sleeve of the side strap adjacent to this end. In this context, they are advantageously cranked, such that the end with the pivoting sleeve points towards the outer side of the chain link and the end with the pivoting journal points towards the inner side of the chain link, or vice versa. In this way, only one type of side strap is required for both side strap strands for energy guiding chains of different width. However, it may be advantageous to provide the two side strap strands with side straps of mirror-image design.

In another embodiment, the side strap strands are assembled from alternating side straps, respectively oriented towards the inner or outer side of the chain link. For example, the inner straps can display two pivoting journals, and the outer straps two pivoting sleeves in this context. It is also possible to provide both the outer straps and the inner straps with one pivoting sleeve and one pivoting journal. If the demands on the energy guiding chain allow, it is advantageous to provide only the outer straps with rollers, this reducing the cost of manufacturing and stocking the inner straps.

The invention can also be executed by not providing all side straps with rollers. Chain links with the features according to the invention can easily be joined to chain links not displaying rollers.

In order to limit the pivoting angle between adjacent side straps, and thus enable a uniform radius of curvature in the deflection zone, the side straps display mechanical stops that can interact with an abutment on the adjacent side straps.

The invention will now be explained in more detail on the basis of the enclosed drawings. The Figures show the following:

FIG. 1 An oblique view of a partially dismantled chain link according to the invention, FIG. 2 A side view of a piece of a chain with a chain link according to the invention, FIG. 3 Four sections through the piece of chain shown in FIG. 2, and FIG. 4 An oblique view of the piece of chain shown in FIG. 2.

FIG. 1 shows an oblique view of a chain link 1 with the features according to the invention. It consists of two side straps 11, 12, which are mirror-inverted relative to each other and each display a pivoting sleeve 13 and a pivoting journal 14, which serve the purpose of connecting to the adjacent chain link in pivoting fashion during assembly. At the end displaying pivoting sleeve 13, side strap 11 forms the outer surface 15 of chain link 1, while the inner surface 16 of side strap 11 is exposed on the end displaying pivoting journal 14.

Rollers 21 are recessed into side straps 11, 12. They are mounted on pivot 24 (not shown) by means of ball bearing 23 and protected by cover 22, which is secured by screws. When the chain is stretched out, narrow faces 17 of side straps 11, 12 form a continuing running surface on which rollers 21 can roll.

Located between the side straps are cross-members 31—in this case, two inner cross-members 31i, close to running surface 17, and two outer cross-members 31a. The ends of the cross-members display extensions 33 with journals 34. The journals can be pressed behind snap-in nose 32 through openings in the outer narrow face of the side straps. In this context, they remain pivotable about the journals, insofar as the other end is free. In contrast, the extensions and journals of the inner cross-members can be inserted into undercut recesses 35, undergoing elastic deformation, in which process the journals snap into the undercut. This connection can only be released by inserting a suitable tool into the outward-leading opening 36 in recess 35.

FIG. 2 shows a side view of a chain link according to the invention within an energy guiding chain, which is in this case supplemented by shorter chain links without rollers. Above all, this Figure shows the four sections illustrated and explained in more detail in FIG. 3.

FIG. 3a) shows a section through the fastening of an inner cross-member 31i. In this case, extension 33 with the journal has already been inserted into recess 35. The journal on extension 33 is fixed behind undercut 37. By inserting a tool into opening 36, extension 33 can be forced aside and the journal released.

FIG. 3b) shows a section, transverse to the energy guiding chain, through the pivotal point of rollers 21, which are mounted on pivot 24 by means of ball bearing 23.

FIG. 3c) shows a section through extension 33 on outer cross-members 31a in assembled state. Extensions 33 of cross-member 31a have been inserted into opening 38 from the narrow face of the side strap, while the extensions of inner cross-member 31i have been inserted into recess 35 from inner side 16 of the side straps.

FIG. 3d) is a further section, illustrating snap-in nose 32, which retains journal 34 on extension 33 of outer cross-member 31a in assembled state.

FIG. 4 illustrates how a chain link with the features according to the invention can be integrated into an energy guiding chain and connected to further side straps that do not display rollers.

Energy Guiding Chain with Rollers

LIST OF REFERENCE NUMBERS

1 Chain link
11 Left side strap
12 Right side strap
13 Pivoting sleeve
14 Pivoting journal
15 Outer surface
16 Inner surface
17 Narrow face, running surface
18 Further side straps
21 Roller
22 Cover
23 Ball bearing
24 Pivot
31i Inner cross-member
31a Outer cross-member
32 Snap-in nose
33 Extension
34 Journal
35 Undercut recess
36 Outward-leading opening
37 Undercut
38 Opening in the narrow face

What is claimed is:

1. An energy guiding chain, to guide hoses, cables and the like, comprising:
 a number of chain links connected to each other in articulated fashion, said chain links being formed by side straps, which are parallel to each other and connected to form parallel side strap strands, and cross-members having opposing ends connected to the side straps,
 wherein the side straps are pivotable relative to each other about a pivoting axis common to two adjacent side straps,
 wherein the energy guiding chain is transversable in such a way that the energy guiding chain forms a loop having an upper strand, a lower strand and a deflection zone connecting the upper strand and the lower strand, as a result of which an inner side and an outer side in relation to the loop is defined on the chain links,
 wherein the upper strand rests on the lower strand, this involving at least partial contact of the inner sides of the chain links, and
 wherein the cross-members on the outer side of the chain links are detachable from the side strap at at least one of the ends of the cross-members and pivotable in order to open the chain links, while the cross-members on the inner side of the chain links are permanently connected to the side straps,
 wherein rollers are recessed into at least some of the side straps, said rollers projecting from a narrow face of the side straps and being rollable on the narrow faces of the side straps of the opposite strand during traversing of the chain,
 wherein the ends of the cross-members are provided with extensions displaying journals, and inner surfaces of the side straps are provided with undercut recesses engageable with the journals of the cross-members facing the inner side of the loop to establish a permanent connection of the inner cross-members, whereas the cross-members facing the outer side of the loop are inserted into openings in the narrow faces of the side straps, where they are retained elastically and pivotably by a snap nose.

2. The energy guiding chain according to claim 1, wherein the permanent connection is is releasable only with a tool.

3. The energy guiding chain according to claim 1, wherein the side straps are designed in such a way that one of their ends displays a pivoting sleeve to accommodate the pivoting journal of the adjacent side strap, the other end displaying a pivoting journal for inserting into the pivoting sleeve of the side strap adjacent to this end.

4. The energy guiding chain according to claim 3, wherein the side straps are cranked, such that the end with the pivoting sleeve points towards the outer side of the chain link and the end with the pivoting journal points towards the inner side of the chain link, or vice versa.

5. The energy guiding chain according to claim 1, wherein the side strap strands consist of side straps arranged to face alternately towards the inside and the outside of the chain link.

6. The energy guiding chain according to claim 5, wherein only the side straps facing outwards are provided with rollers.

7. The energy guiding chain according to claim 1, wherein the pivoting angle between adjacent slide straps is limited by mechanical stops and abutments.

\* \* \* \* \*

UNITED STATES PATENT AND TRADEMARK OFFICE
CERTIFICATE OF CORRECTION

| | | |
|---|---|---|
| PATENT NO. | : 9,163,699 B2 | Page 1 of 1 |
| APPLICATION NO. | : 14/395117 | |
| DATED | : October 20, 2015 | |
| INVENTOR(S) | : Thilo-Alexander Jaeker | |

It is certified that error appears in the above-identified patent and that said Letters Patent is hereby corrected as shown below:

In the Claims

In column 5, line 7, in claim 2, before "releasable" delete "is".

In column 5, line 26, in claim 7, delete "slide" and insert -- side --, therefor.

Signed and Sealed this
Tenth Day of May, 2016

Michelle K. Lee
*Director of the United States Patent and Trademark Office*